C. N. WISNER.
COTTON PICKER HEAD.
APPLICATION FILED MAR. 8, 1917.
1,336,176. Patented Apr. 6, 1920.
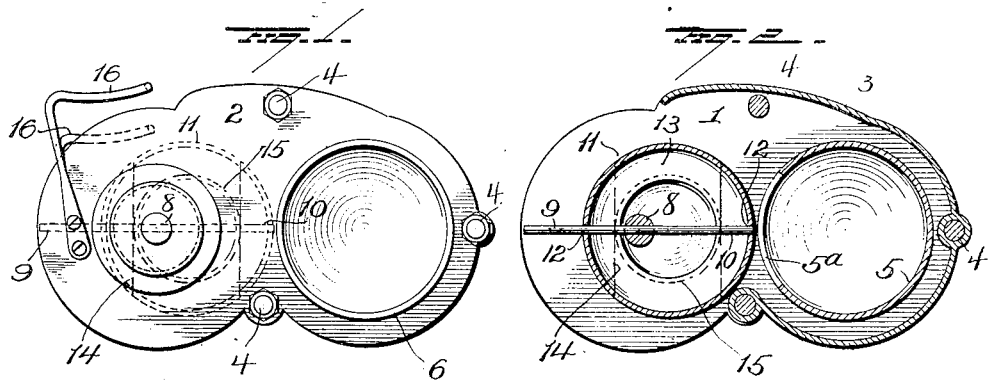
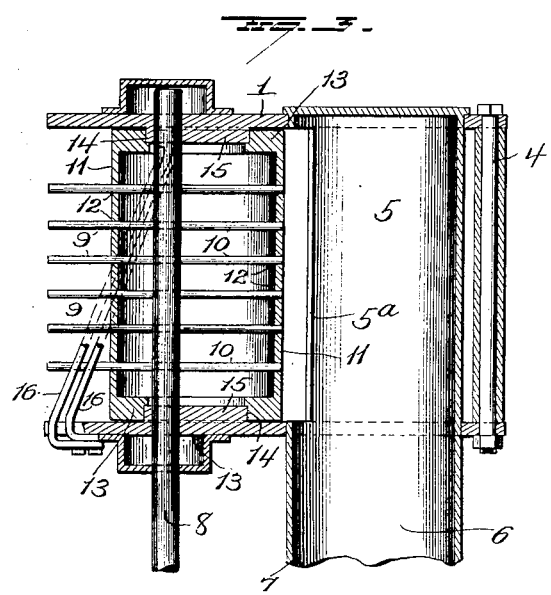
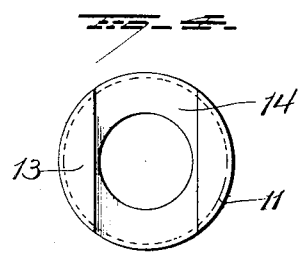
WITNESSES
INVENTOR
Attorneys

UNITED STATES PATENT OFFICE.

CLARK NOBLE WISNER, OF NEW ORLEANS, LOUISIANA, ASSIGNOR TO C. N. WISNER COTTON PICKER CO., INCORPORATED, OF NEW ORLEANS, LOUISIANA.

COTTON-PICKER HEAD.

1,336,176.  Specification of Letters Patent.  Patented Apr. 6, 1920.

Application filed March 8, 1917. Serial No. 153,335.

*To all whom it may concern:*

Be it known that I, CLARK N. WISNER, a citizen of the United States, and a resident of New Orleans, in the parish of Orleans and State of Louisiana, have invented certain new and useful Improvements in Cotton-Picker Heads; and I do hereby declare the following to be a full, clear, and exact description of the invention, such as will enable others skilled in the art to which it appertains to make and use the same.

This invention relates to improvements in cotton pickers, and more particularly to an improved picker head,—one object of the invention being to so construct a picker head that the same shall effectually remove the cotton from the boll and so that the quick and complete shedding of the cotton from the picking fingers and its delivery to the tube which conveys it to a suitable receptacle, shall be facilitated.

A further object is to provide a picker head having a single rotating picker cylinder and coöperating picker pins, with means to engage the cotton boll in a manner to prevent the same from being moved away from the picking fingers during the picking operation.

With these and other objects in view, the invention consists in certain novel features of construction and combinations of parts as hereinafter set forth and pointed out in the claims.

In the accompanying drawings: Figure 1 is an end elevation of a picker head embodying my improvements; Fig. 2 is a transverse sectional view; Fig. 3 is a longitudinal sectional view, and Fig. 4 is a detail view illustrating one of the cam devices.

The frame of the picker head comprises two end plates 1 and 2 spaced apart and a housing 3, the whole being rigidly secured together by means of suitable bolts 4.

A tube 5 is located with the housing and suitably secured to the end plates, and made with an elongated opening 5ª. The tube is closed at one end and its other end is adapted for connection with a suitable conveyer, 6, a portion of which latter may form a handle 7 projecting from one of the end plates of the frame. The conveyer 6 may be a pneumatic tube connected with suitable suction means, not shown.

Bearing boxes are provided on the end plates 1, 2 of the frame to provide journal bearings for a shaft 8 which extends from one of said plates to the other and through suitable openings in said plates. The shaft 8 carries two sets of picker pins 9—10 which are secured rigidly thereto and the respective sets of pins project from the shaft in diametrically opposite directions.

A picker cylinder 11 is disposed between the end plates 1, 2, and surrounds the shaft 8,—said cylinder having openings 12, 12 through which the picker pins 9—10 pass, so that when the shaft is rotated, the cylinder will also be rotated through the medium of the picker pins. The cylinder 11 is provided at its respective ends with heads 13, 70 and these heads are made with an opening 14 to receive cams 15 made integral with or rigidly fixed to the inner faces of the end plates 1, 2. The shaft 8 may be from a suitable motor by means of a flexible or other driving shaft connected with said shaft 8, without necessity for interposed gearing.

It will be understood that when the shaft 8 is rotated, motion will be imparted to the cylinder 11 to rotate the same as above stated, and that when the cylinder is thus rotated, the cams 15 will cause it also to move laterally, so that in one position, one set of picker pins will be exposed and permitted to project outwardly beyond the wall of the cylinder to engage the cotton boll and remove the cotton therefrom, and so that as the shaft 8 continues to revolve, the pins will carry the cotton toward the opening 5ª in the tube 5 and at the same time cause the cylinder 11 to move laterally on the pins and strip the cotton from the latter so that it may enter the tube 5 and pass therefrom to the conveyer. During these operations, with respect to one set of pins, the other set of pins will become exposed and caused to pick and deliver cotton in the same manner as above described, as the rotation of the shaft and cylinder continues.

In order to prevent the cotton bolls from being so moved by the picker pins as to hinder the proper picking of the cotton therefrom, I provide the picker head with an abutment device which will engage the boll and prevent the same from being driven away by engagement of the picker pins. In the present instance, I provide fingers 16 which may be secured to one of the end plates of the frame and disposed in front of the path of the picker pins. These fingers serve as an abutment to hold the boll while the picker pins are removing the cotton therefrom. It will be found to be of advantage to so arrange these fingers that they will be disposed diagonally in front of the picking means so that the boll may readily slide off the same when the cotton has been removed by the picker pins.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a picker head, the combination with a frame, and a receiving tube therein, of a single revolving picker mounted in said frame and having picker pins, and an abutment device secured to the frame and disposed in front of the path of said picker pins and in position to engage a cotton boll while the pins are removing cotton therefrom.

2. In a picker head, the combination with a frame, and a receiving tube therein, of a single revolving picker having picker pins, mounted in said frame, and an abutment finger secured to said frame and disposed in front of the path of the picker pins, said finger being positioned to engage the boll and prevent displacement thereof while the cotton is being removed by the picker pins.

3. In a picker head, the combination with a frame, and a receiving tube therein, of a single revolving picker having picker pins, mounted in said frame, and abutment fingers secured to the frame and disposed diagonally in front of the path of the picker pins.

In testimony whereof, I have signed this specification in the presence of two subscribing witnesses.

CLARK NOBLE WISNER.

Witnesses:
H. L. HAMMETT,
SAMUEL C. MANFRE.